Jan. 8, 1952     S. B. HASELTINE     2,581,531
FRICTION SHOCK ABSORBING MECHANISM FOR RAILWAY CAR TRUCKS
Filed July 13, 1948
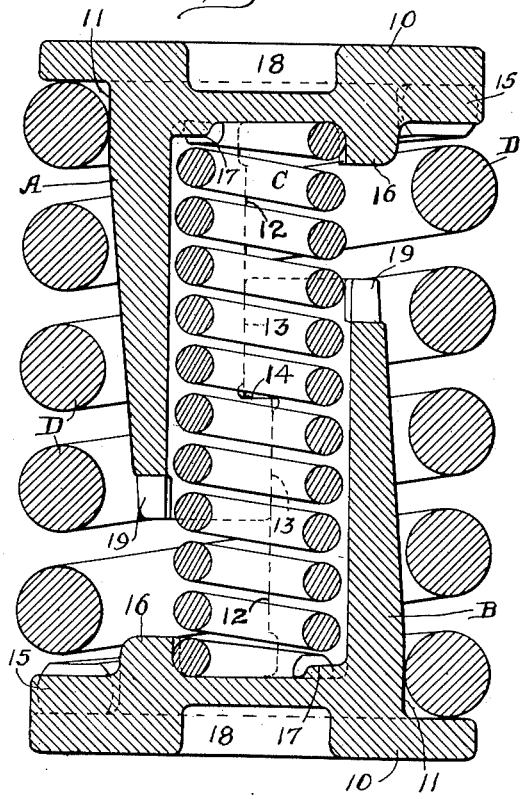
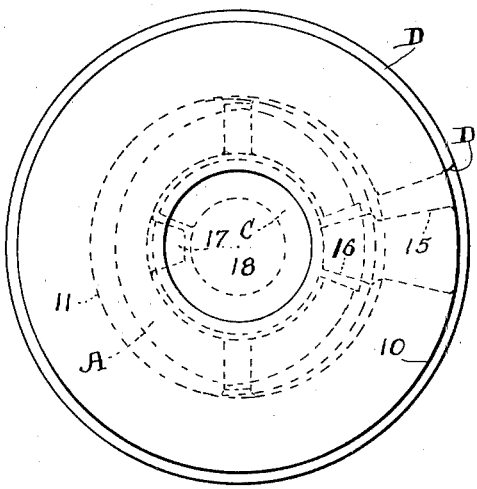
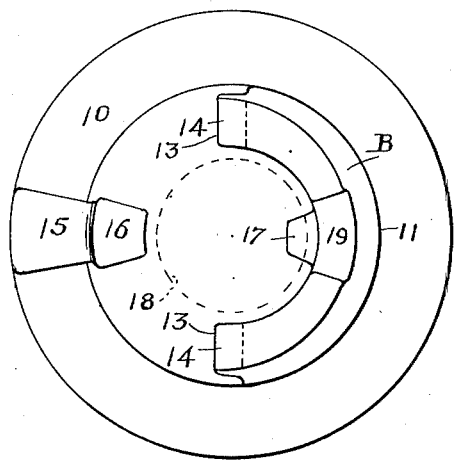
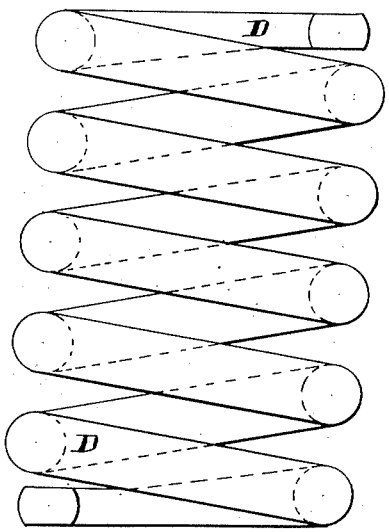
Inventor:
Stacy B. Haseltine.
By Henry Fuchs.
Atty.

Patented Jan. 8, 1952

2,581,531

UNITED STATES PATENT OFFICE 2,581,531

FRICTION SHOCK ABSORBING MECHANISM FOR RAILWAY CAR TRUCKS

Stacy B. Haseltine, La Grange, Ill., assignor to W. H. Miner, Inc., Chicago, Ill., a corporation of Delaware Application July 13, 1948, Serial No. 38,464

7 Claims. (Cl. 267—9)

This invention relates to improvements in friction shock absorbing mechanisms, especially adapted for use as snubbing devices for springs of railway car trucks.

One object of the invention is to provide a friction shock absorbing mechanism, comprising relatively movable, hollow friction posts having longitudinally extending edge faces in sliding frictional engagement with each other, and spring means opposing relative lengthwise movement of the posts, comprising a spring element surrounding said posts, yieldingly opposing relative lengthwise movement of the posts toward each other, and exerting lateral pressure on the posts to force the same toward each other into tight frictional contact along their engaging friction surfaces.

A further object of the invention is to provide a friction shock absorbing mechanism as set forth in the proceding paragraph, wherein the spring means is in the form of a helical coil spring surrounding said posts and under canting tension in the assembled condition of the mechanism to exert pressure against the posts to force the same laterally toward each other, the spring, in its normal condition, before assembly with the posts, having, when stood on end, the axis thereof on which it is coiled canted or inclined to the vertical to laterally offset one end of the spring with respect to the other, whereby the same is placed under canting tension when forcibly flexed from canted to righted position.

Other objects of the invention will more clearly appear from the description and claims hereinafter following.

In the accompanying drawing forming a part of this specification, Figure 1 is a central longitudinal, vertical sectional view of my improved shock absorbing mechanism. Figure 2 is a top plan view of Figure 1. Figure 3 is a top plan view of the bottom friction post shown in Figure 1. Figure 4 is a side elevational view, on a reduced scale, of the outer coil spring employed in my improved shock absorbing mechanism, showing the condition of the spring before application to the friction posts.

My improved friction shock absorbing mechanism, as shown in the drawing, comprises broadly top and bottom, hollow friction posts A and B having longitudinally extending, interengaging edge faces or surfaces in sliding frictional engagement with each other, an inner coil spring C and an outer coil spring D.

The posts A and B, which are in the nature of hollow shells, are identical. Each post A and B has a circular, disclike follower plate 10 at its outer end formed integral therewith. Each post is in the form of a transversely curved plate, projecting from the corresponding disclike follower. At the base thereof, the curved outer surface of each post is substantially vertically disposed and presents an abutment face 11 for the inner side of the coil at the corresponding end of the spring D. The projecting portion of the post beyond the abutment face has its outer side slightly inclined inwardly toward the central vertical axis of the mechanism to clear the coils of the spring. As illustrated, each of the transversely curved, platelike posts is in the form of a semi-cylindrical shell or half cylinder having friction surfaces along its inner longitudinal edges. Each longitudinal edge presents two friction surfaces 12 and 13, laterally offset with respect to each other. These friction surfaces are preferably in vertical planes and the friction surfaces 13—13, which are at the outer end of each platelike posts, are offset outwardly beyond the surfaces 12—12, thus providing transverse stop shoulders 14—14. The friction surfaces 13—13 of the top post A are at the lower end thereof and engage with the surfaces 12—12 of the bottom post B, and the friction surfaces 13—13 of the latter are at the upper end thereof and engage with the surfaces 12—12 of the post A. As will be seen upon reference to Figure 1, the shoulders 14—14 of the top post A engage beneath the shoulders 14—14 of the bottom post B and limit vertical separation of the posts and maintain the mechanism assembled.

The platelike follower 10 of each post is provided with a radial stop projection in the form of a short rib 15 adapted to be engaged by the tang of the outer spring D for preventing rotary displacement of said spring, the rib 15 being on the side of the follower diametrically opposite to the side thereof from which the post projects. At the inner end of the stop projection or rib 15, the follower plate 10 of each post carries an upstanding abutment lug 16 on which the outer side of the coil at the corresponding and of the inner coil spring C is adapted to bear. A stop projection is also provided on each follower plate cooperating with the corresponding tang of the spring C, the same being in the form of an upstanding lug 17 on said follower plate at the inner side of the corresponding friction post. Each follower plate 10 is further provided with the usual opening 18 adapted to receive the corresponding centering projection of the cooperating spring follower plate of the truck spring cluster.

The spring C, which is in the form of a helical coil, is housed within the hollow top and bottom posts A and B and has its top and bottom ends bearing on the follower plates 10—10 of said posts, and the spring D, which is also in the form of a helical coil, surrounds the posts A and B and bears at its top and bottom ends on the outwardly projecting portions of said follower plates. The springs C and D are under initial compression. The outer side of the coil at the lower end of the spring C bears on the inner side of the abutment lug 16 of the lower follower plate while the outer side of the coil at the upper end of the same bears on the inner side of the lug 16 of the top follower plate, and the inner side of the coil at the lower end of the spring D bears on the abutment face 11 of the bottom post B while the inner side of the coil at the upper end of this spring bears on the abutment face 11 of the post A. The springs C and D are under canting tension in the assembled condition of the mechanism to forcibly maintain the friction surfaces of the posts in tight contact with each other. Each of the springs C and D, as manufactured and before assembly with the posts of the mechanism, has the axis about which it is coiled inclined with respect to the vertical axis of the base of the spring. In other words, the spring is formed so that it leans to one side when stood on its base and tends to return to its leaning or inclined position when forcibly righted by flexing the same to upright position. As illustrated in Figure 4, the spring D is coiled in such a manner, when manufactured, that it leans to the right when stood on its base. Thus, when the spring D is forcibly flexed to the substantially upright position shown in Figure 1, it is placed under canting tension, its inherent resiliency tending to force the same to assume its leaning position, thereby exerting pressure toward the right on the post A and toward the left on the post B. The inner spring C is formed so that it leans or is inclined in the same direction as the spring D when stood on end, and in the assembled condition of the mechanism forces the top post A to the right and the bottom post B to the left, as seen in Figure 1, by engagement of the outer sides of the coils at the opposite ends thereof with the abutment lugs 16—16 of the top and bottom followed plates, respectively.

In assembling the mechanism, the spring C is first seated within the bottom post B and the spring D engaged over this post. In assembling the springs with the post B, they are placed so that the tang at the lower end of the spring C is in back of the lug 17 of the bottom post, as seen in Figure 1, and the tang at the upper end thereof will be in back of the lug 17 of the top post when the same is assembled with the post B, and the tang at the lower end of the spring D is in back of the rib 15 of the bottom post and the tang at the upper end thereof will be in back of the rib 15 of the post A. The post A is then assembled with the other parts by inserting the same downwardly within the outer spring D and about the inner spring C. The posts A and B are then forced together until the shoulders 14—14 and 14—14 pass each other, whereupon the shoulders of the post A will snap under the shoulders of the post B, locking the posts together against lengthwise separation. At the same time, the springs C and D are forcibly flexed from leaning to upright position and the end coils brought into bearing engagement with the lugs 16—16 and the abutment faces 11—11 of the posts.

My improved shock absorbing mechanism preferably replaces one or more of the spring units of a truck spring cluster, being interposed between the usual top and bottom spring plates which cooperate with said cluster.

The operation of my improved shock absorbing mechanism as as follows: Upon the spring cluster of the truck of a railway car being compressed between the spring follower plates of the cluster, my improved shock absorbing mechanism, which is disposed between said follower plates, is compressed therewith, thereby forcing the post A downwardly toward the post B against the resistance of the springs C and D. Due to the canting tension of the springs C and D, the posts are held in tight frictional contact during this relative movement of the same, thereby providing the desired frictional resistance between said posts. Compression of the mechanism is positively limited by engagement of the outer end of each post with the follower plate of the other post, the end of each post being notched, as indicated at 19, to clear the projecting lug 16 of the other post.

Upon release of the mechanism, the posts A and B are restored to the normal position shown in Figure 1 by the expansive action of the springs C and D, longitudinal separation of the posts being limited by engagement of the shoulders 14—14 and 14—14 of the posts with each other.

I claim:

1. In a friction shock absorbing mechanism, the combination with a pair of hollow friction posts movable toward and away from each other lengthwise of the mechanism, said posts having longitudinally extending, interengaging friction surfaces at diametrically opposite sides of the mechanism, said friction surfaces at opposite sides of the mechanism being in transverse alignment, each post having a fixed follower thereon, said followers being at opposite ends of the mechanism; of a coil spring within said posts opposing relative approach thereof; and a second coil spring opposing relative approach of said posts, said second spring surrounding said posts and bearing at opposite ends on said followers respectively.

2. In a friction shock absorbing mechanism, the combination with a pair of hollow friction posts movable toward and away from each other lengthwise of the mechanism, said posts having longitudinally extending, interengaging friction surfaces at diametrically opposite sides of the mechanism, said friction surfaces at opposite sides of the mechanism being in transverse alignment, each post having a fixed follower thereon, said followers being at opposite ends of the mechanism; of a coil spring within said hollow posts opposing relative approach thereof; and a second coil spring opposing relative approach of said posts, said second spring surrounding said posts and bearing at opposite ends on said followers respectively.

3. In a friction shock absorbing mechanism, the combination with a pair of hollow friction posts movable toward and away from each other lengthwise of the mechanism, said posts being of U-shaped transverse cross section, and having their longitudinal side edges in lengthwise sliding engagement with each other, each post having a follower thereon, said followers being at opposite ends of the mechanism; of a coil spring within said posts opposing relative approach thereof, said spring being under canting tension to force said posts laterally toward each other;

and a second coil spring opposing relative approach of said posts, said second named spring surrounding said posts and bearing at opposite ends on said followers respectively, said last named spring being under canting tension to force said posts laterally toward each other.

4. In a friction shock absorbing mechanism, the combination with a pair of relatively lengthwise movable hollow friction posts having longitudinally extending, interengaging, straight friction surfaces at diametrically opposite sides of the mechanism; of end followers integral with said posts, said end followers being disposed at opposite ends of the mechanism; a coil spring within said posts opposing relative lengthwise movement thereof toward each other; and a second coil spring surrounding said posts and bearing at opposite ends on said followers, said last named spring being under canting tension to force said posts laterally together.

5. In a friction shock absorbing mechanism, the combination with upper and lower spring follower plates; of a hollow friction post depending from said upper follower plate, said post being rigid with said upper follower plate and having longitudinally extending, straight friction surfaces at diametrically opposite sides thereof; a second hollow friction post upstanding from said lower follower plate, said last named post being rigid with said lower follower plate and having longitudinally extending, straight friction surfaces at diametrically opposite sides thereof engaging with the friction surfaces of said first named post; a coil spring surrounding said posts and bearing at its top and bottom ends on said follower plates; and a spring within said hollow posts opposing relative lengthwise movement thereof toward each other.

6. In a friction shock absorbing mechanism, the combination with an upper spring follower plate; of a lower spring follower plate; an upper hollow friction post depending from said upper plate; a lower hollow friction post upstanding from said lower spring follower plate, said posts having longitudinally disposed, interengaging, vertically extending friction surfaces at diametrically opposite sides of the mechanism; a coil spring surrounding said posts bearing at its top and bottom ends on said upper and lower spring follower plates, said spring having the inner side of the coil at the upper end seated against the outer side of said upper post at the spring follower end of the same, at one side of the mechanism, and the inner side of the coil at the lower end seated against the outer side of the lower post at the spring follower plate end of the same, at the other side of the mechanism; and a second spring coil within said posts opposing relative lengthwise movement thereof toward each other.

7. In a friction shock absorbing mechanism, the combination with a top follower plate; of a bottom follower plate; a top friction post depending from said top follower plate; a bottom friction post upstanding from said bottom follower plate, said posts being hollow and having lengthwise sliding engagement with each other on their inner edges, said top post having a lateral abutment face at its base end at the outer side of the same, said bottom post having a lateral abutment face at its base end at the outer side thereof; a coil spring under tension in canting direction within said posts; and a second coil spring under tension in canting direction enclosing said posts and bearing at its top and bottom ends on said top and bottom follower plates, said second named spring having the inner sides of the top and bottom coils thereof bearing on said lateral abutment faces of said posts.

STACY B. HASELTINE.

REFERENCES CITED

The following references are of record in the file of this patent:

UNITED STATES PATENTS

| Number | Name | Date |
|---|---|---|
| 1,924,814 | Sproul | Aug. 29, 1933 |
| 1,953,219 | Fuchs | Apr. 3, 1934 |
| 2,162,342 | Anderson | June 13, 1939 |
| 2,395,171 | Dath | Feb. 19, 1946 |
| 2,410,160 | Haseltine | Oct. 29, 1946 |
| 2,410,165 | Johnson et al. | Oct. 29, 1946 |
| 2,524,914 | Lehman | Oct. 10, 1950 |